United States Patent [19]

Gibbons

[11] Patent Number: 4,693,310

[45] Date of Patent: Sep. 15, 1987

[54] CONFORMANCE CORRECTION TO IMPROVE HYDROCARBON RECOVERY FROM A SUBTERRANEAN FORMATION

[75] Inventor: David L. Gibbons, Littleton, Colo.

[73] Assignee: Marathon Oil Company, Findlay, Ohio

[21] Appl. No.: 939,985

[22] Filed: Dec. 10, 1986

[51] Int. Cl.$^4$ .......................................... E21B 33/138
[52] U.S. Cl. ................................................... 166/270
[58] Field of Search .............. 166/295, 294, 270, 273, 166/274; 252/8.55 D

[56] References Cited

U.S. PATENT DOCUMENTS

| | | | |
|---|---|---|---|
| Re. 29,716 | 8/1978 | Clampitt et al. | 166/270 X |
| 3,749,172 | 7/1973 | Hessert et al. | 166/270 X |
| 3,757,863 | 9/1973 | Clampitt et al. | 166/270 X |
| 3,762,476 | 10/1973 | Gall | 166/270 X |
| 3,909,423 | 9/1975 | Hessert et al. | 252/8.55 D |
| 3,926,258 | 12/1975 | Hessert et al. | 166/275 X |
| 4,110,230 | 8/1978 | Hessert et al. | 252/8.55 R |
| 4,148,746 | 4/1979 | Klemmensen et al. | 166/274 X |

*Primary Examiner*—Stephen J. Novosad
*Attorney, Agent, or Firm*—Jack L. Hummel; Rodney F. Brown

[57] ABSTRACT

A non-crosslinking salt of a monovalent cation is added to a gelation solution comprising an acrylamide polymer and a redox crosslinking system to render the viscosity and uniformity of the resulting gel less sensitive to the concentrations of the gel components. The gel is used for conformance correction treatments of subterranean hydrocarbon-bearing formations to reduce the permeability of a high permeability zone adjacent a low permeability zone.

28 Claims, No Drawings

CONFORMANCE CORRECTION TO IMPROVE HYDROCARBON RECOVERY FROM A SUBTERRANEAN FORMATION

BACKGROUND OF THE INVENTION

1. Technical Field

The invention relates to a process for recovering hydrocarbons from a subterranean hydrocarbon-bearing formation and more particularly to a process for improving conformance and flow profiles at or away from a well bore penetrating the formation.

2. Description of Related Art

Poor vertical conformance results from the vertical juxtaposition of relatively high permeability geologic zones to relatively low permeability zones within a subterranean formation. Poor areal conformance results from the presence of high permeability streaks and high permeability anomalies within the formation matrix, such as vertical fractures and networks of the same, which have very high permeability relative to the formation matrix. Fluids generally exhibit poor flow profiles and sweep efficiencies in subterranean formations having poor vertical or areal conformance. Poor conformance is particularly a problem where vertical heterogeneity and/or fracture networks or other structural anomalies are in fluid communication with a subterranean well bore across which fluids are injected or produced.

A number of conformance correction treatments exist. U.S. Pat. Nos. 3,909,423 and 4,110,230 to Hessert et al disclose gel compositions and processes for using the gels for conformance correction treatments. Unfortunately, the properties of such gels taught in the art are extremely sensitive to variations in gelation parameters such as gel component concentrations. It is usually necessary to preliminarily design a gel treatment in a laboratory under idealized conditions before the gel treatment can be employed in the field. Even so, it may be impossible to design an effective gel treatment because a hostile gelation environment may require a gel having component concentrations outside the operable ranges of a given process.

A present need exists for a conformance correction process employing a gel which is relatively insensitive to variations in specific gelation parameters which are required by oil field conditions. A process is needed for preparing a gel across a broad range of gel component concentrations without sacrificing the ability of the gel to meet the performance demands of differing subterranean formations.

SUMMARY OF THE INVENTION

The present invention provides a process for improving vertical and areal conformance in a subterranean hydrocarbon-bearing formation penetrated by a production and/or injection well and for correspondingly improving flow profiles and sweep efficiencies of injected and/or produced fluids in the formation. The objectives are achieved by means of a viscous, uniform, stable polymer gel which can be prepared in a manner relatively insensitive to the concentration of the gel components.

The gel is prepared by dissolving a high molecular weight, water-soluble acrylamide polymer, a redox crosslinking system and a non-crosslinking salt of a monovalent cation in an aqueous solvent. The resulting gelation solution is injected into a desired treatment region of a subterranean hydrocarbon-bearing formation via a well bore in fluid communication therewith. A continuous, single-phase, stable gel forms in situ which substantially reduces the permeability of the desired treatment region and thereby effects conformance correction in the formation.

After the treatment, fluid may be more effectively injected into or produced from the hydrocarbon-bearing regions of the formation in fluid communication with the well bore. The gel is substantially incapable of flowing from the treatment region and is substantially permanent and resistant to in situ degradation.

The process provides distinct advantages over gelation processes known in the art. The practitioner of the present invention can produce gels effective for conformance correction treatments without being restricted to the limited type of gel formulations known in the art. Thus, the practitioner can vary the relative concentration of components in the gelation solution over a broad range as necessitated by fixed in situ gelation conditions, such as temperature or connate water composition, without sacrificing the stability, strength, and uniformity of the ultimae gel product which are necessary properties to meet the performance demands of the formation.

DESCRIPTION OF PREFERRED EMBODIMENTS

The present invention is described in the context of specific terms which are defined as follows. "Vertical conformance" is a measure of the degree of geologic uniformity and permeability as one moves vertically across the formation. "Areal conformance" is a measure of the degree of geologic uniformity and permeability as one moves horizontally across the formation. A "flow profile" quantitatively describes the uniformity of fluid flow through a subterranean formation while "sweep efficiency" is the quantitative analog of "flow profile." "Plugging" is a substantial reduction in permebility in a region of a formation. The term "gel" as used herein is a uniform, single-phase, ultra-high molecular weight system, comprises two components, a solid three-dimensional crosslinked polymeric network and a liquid medium confined within the network.

The gel composition utilized in the present invention comprises an acrylamide polymer, a redox crosslinking system and a non-crosslinking salt of a monovalent cation. The acrylamide polymer is either polyacrylamide or partially hydrolyzed polyacrylamide, depending on the number of carboxylate groups it has. An acrylamide polymer having substantially less than 1% of the acrylamide groups in the form of carboxylate groups is termed polyacrylamide (PA); an acrylamide polymer having at least 1% but not 100% of the acrylamide groups in the form of carboxylate groups is termed partially hydrolyzed polyacrylamide (PHPA). The average molecular weight of the acrylamide polymer is in the range of about 10,000 to about 50,000,000 and preferably about 100,000 to about 20,000,000 and most preferably about 200,000 to about 12,000,000. When PHPA is employed, it is preferably about 10 to about 40% hydrolyzed.

The redox crosslinking system comprises a water-soluble compound of a polyvalent metal, which has a higher valence state capable of being reduced to a lower valence state, and a water-soluble reducing compound, which is effective to reduce at least a portion of the polyvalent metal to the lower valence state. Common redox crosslinking systems are known in the art. Sodium dichromate and hydrates thereof are preferred compounds of a polyvalent metal. Sodium bisulfite is a preferred reducing compound.

The salt comprises a monovalent cation. The monovalent salt does not substantially crosslink the polymer by itself in the absence of one of the above-described crosslinking agents. Exemplary monovalent cations in the salt include metals such as sodium or potassium, and ammonium. Monovalent salts such as $NH_4Cl$, $KI$, $NaNO_2$, $NaCl$, $NaI$, $Na_2SO_4$ and $NaOOCCH_3$ are preferred in the practice of the present invention. The inorganic salt, $NaCl$, is most preferred because of its effectiveness and relatively low cost.

One can produce high-viscosity, single-phase, continuous, uniform, stable gels according to the present invention which are relatively insensitive o the concentration of the necessary components in the gelation solution. Effective gels for plugging high permeability zones in subterranean formations should reduce flow of fluids through the treatment zone but the gels themselves should not flow from the treatment zone upon complete gelation, even when subjected to severe downhole conditions of temperature, pressure and the like. High viscosity gels meeting these criteria generally have viscosities above about 2,000 cp and preferably above about 10,000 cp. The gels produced according to the present invention do not substantially exhibit syneresis or two-phase behaviour which would diminish their effectiveness for conformance correction because they would undesirably migrate from the treatment zone during oil recovery operations.

The operable concentration ranges of the gel components are a function of the acrylamide polymer characteristics, including molecular weight and degree of hydrolysis. However, in general, the polymer concentration range in the gelation solution is about 500 to about 100,000 ppm of the total gelation solution, preferably about 1000 to about 6000 ppm, and most preferably about 2,000 to about 4,000 ppm of the total gelation solution. The concentration range of polyvalent metal-containing compound is about 100 to about 640,000 ppm of the total gelation solution, preferably about 200 to about 40,000 ppm and most preferably about 200 to about 15,000 ppm of the total gelation solution. The concentration of reducing agent is about 100 to about 640,000 ppm of the total gelation solution, preferably about 200 to about 40,000 ppm and most preferably about 200 to about 15,000 ppm of the total gelation solution.

The salt of the monovalent cation (i.e., monovalent salt) is added to the gelation solution in an amount sufficient to substantially diminish the sensitivity of the gel viscosity to the concentration of gel components. This is generally an amount such that the molar ratio of monovalent salt to polymer in the total gelation solution is about 20,000 to about 2,000,000 and preferably about 100,000 to about 300,000 moles monovalent salt to about 1 mole polymer. This corresponds to a monovalent salt concentration in the gelation solution of about 500 to about 50,000 ppm, preferably about 3,000 to about 30,000 ppm and most preferably about 4,000 to about 7,000 ppm of the total gelation solution.

In contrast, if insufficient monovalent salt is present in the gelation solution, stable uniform high-viscosity gels can only be produced from gelation solutions having considerably narrower concentration ranges, all other gelation conditions being equal. Absent sufficient monovalent salt, the required polymer concentration would be about 3,000 to about 3,400 ppm, the required polyvalent metal-containing compound concentration would be about 2,000 to about 4,000 ppm and the required reducing agent concentration would be about 2,000 to about 4,000 ppm in the total gelation solution. Thus, it is apparent that the presence of sufficient monovalent salt in the initial gelation solution reduces the dependence of the resultant gel viscosity on initial gel component concentrations.

The present invention is most effective when the solvent of the gelation solution is a fresh water which is substantially free of monovalent salts. However, gels can also be prepared using brine solvents provided the monovalent salt is added to the brine solvent in a concentration which does not surpass the upper limits of the concentration range specified above.

The gelation solution is admixed in situ by sequentially injecting separate polymer and crosslinking system slugs into a well bore in fluid communication with the desired treatment zone and displacing the slugs into the zone. The monovalent salt may be incorporated into the gelation solution by injecting a monovalent salt solution into the well bore as a separate slug which mixes with the other components in situ or by admixing the monovalent salt with the crosslinking system slug prior to injection. However, the monovalent salt is preferably incorporated into the gelation solution by admixing it with the polymer slug prior to injection.

The volume of gelation solution injected into the formation is a function of the volume and location of the desired treatment region and the desired degree of penetration into the treatment region by the solution. One skilled in the art can determine the required volume of gel for a given treatment region. Placement of the gelation solution in the treatment region may be facilitated by zone isolation means such as packers and the like.

Injection rate is a function of the operational constraints of injection pressure and pumping limits. The required injection rate is fixed such that all the slugs can be practically injected without mixing and geling in the treatment zone to a point that they become unpumpable. The presence of the monovalent salt in the polymer slug substantially reduces the viscosity of the polymer slug which advantageously reduces the required injection time for a given volume of polymer.

The gelation time of the gel in situ ranges from about 12 to about 300 hours. Gelation is preferably completed within 72 hours after injection of the slugs into the desired treatment zone. Longer gelation times are limited by practical considerations of lost production when injection and production wells are shut in.

The process is applicable to carbonate and sandstone strata. It is specific to treating regions within the formation which are in fluid communication with an injection or production well. The slugs enter a selected high permeability zone of the formation and crosslink to completion in situ. The gel will not flow from the treatment zone upon complete gelation.

Although the specific mechanism of the present invention is not known, it is believed that certain salts enhance the formation of crosslinked gels from partially hydrolyzed polyacrylamide and redox crosslinking systems by promoting the formation of binuclear, trinuclear, and tetranuclear polyvalent metal complexes. Specifically, the anions of monovalent non-crosslinking salts, such as $Cl^-$, $I^-$, $SO_4^{2-}$, and acetate, appear to promote the formation of the polyvalent complexes which are extremely effective crosslinkers of the polymer. A stable gel can be produced according to the present invention which is less sensitive to the concentrations of the polymer and redox crosslinking system. These concentrations would otherwise be extremely restrictive variables to the formation of stable gels from conventional gelation solutions.

The following examples demonstrate the practice and utility of the present invention but are not to be construed as limiting the scope thereof.

EXAMPLE 1

A partially hydrolyzed polyacrylamide (PHPA) solution is prepared having a concentration of 3,500 ppm by diluting a concentrated polymer solution in fresh water. The PHPA is about 30% hydrolyzed and has an average molecular weight of about 5,000,000. A sodium dichromate solution is prepared in fresh water having a concentration of 62,000 ppm and a sodium bisulfite solution is prepared in fresh water having a concentration of 91,000 ppm. The polymer, sodium dichlormate and sodium bisulfite solutions are combined in different weight ratios to form gel samples, each having a total mass of 20 grams. Table 1 shows the concenration of the polymer and crosslinking system constituents of each gel sample.

TABLE 1

| Gel Sample Number | PHPA (wt % ± 0.01) | Sodium Dichromate (wt %) | Sodium Bisulfite (wt %) |
| --- | --- | --- | --- |
| 1 | 0.22 | 1.2 | 1.5 |
| 2 | 0.27 | 0.77 | 0.95 |
| 3 | 0.29 | 0.55 | 0.68 |
| 4 | 0.31 | 0.37 | 0.50 |
| 5 | 0.32 | 0.31 | 0.36 |
| 6 | 0.33 | 0.22 | 0.27 |
| 7 | 0.33 | 0.15 | 0.18 |
| 8 | 0.34 | 0.12 | 0.14 |
| 9 | 0.34 | 0.092 | 0.11 |
| 10 | 0.34 | 0.062 | 0.091 |
| 11 | 0.34 | 0.046 | 0.068 |
| 12 | 0.35 | 0.037 | 0.055 |
| 13 | 0.35 | 0.031 | 0.045 |

The samples are allowed to stand for 72 hours and the viscosity of the gel is measured at that point. The data is recorded in Table 2 below.

TABLE 2

| Gel Sample Number | Viscosity (cp) |
| --- | --- |
| 1 | ≅1 |
| 2 | ≅1 |
| 3 | ≅1 |
| 4 | >10,000 |
| 5 | >10,000 |
| 6 | >10,000 |
| 7 | 840 |
| 8 | 34 |
| 9 | 47 |
| 10 | 48 |

The results of Table 2 indicate that the viscosity of gels prepared in a fresh water solvent, adding only polymer and crosslinking agent, are extremely sensitive to the concentration of these components. High viscosity gels can only be formed within a very narrow concentration range of gel components in the absence of a simple non-crosslinking salt in the gelation solution.

EXAMPLE 2

A 14.7 wt% ammonium chloride solution is prepared and varying amounts of it are added to the gel samples corresponding to Table 1 during their formulation. The amount of salt solution added to the gelation solution is such that the mole ratio of salt to PHPA is constant in each sample at about 200,000 moles salt to 1 mole PHPA. The results are shown in Table 3 below.

TABLE 3

| Gel Sample Number | Viscosity (cp) | $NH_4Cl$ Conc (wt %) |
| --- | --- | --- |
| 1 | * | 0.44 |
| 2 | * | 0.54 |
| 3 | * | 0.59 |
| 4 | * | 0.62 |
| 5 | >10,000 | 0.63 |
| 6 | >10,000 | 0.65 |
| 7 | >10,000 | 0.67 |
| 8 | >10,000 | 0:68 |
| 9 | >10,000 | 0.68 |
| 10 | >10,000 | 0.69 |

*Gel exhibits severe syneresis. The gel is separated into a watery low-viscosity phase and a highly viscous phase. The two-phase gel is unsuitable for conformance treatment.

The addition of ammonium chloride to the gelation solution renders the solution substantially less sensitive to variations in the concentration of the gel components as evidenced by the fact that high viscosity gels are obtained over a broad range of gel component concentrations.

EXAMPLE 3

Gel samples are prepared corresponding to Table 1. Different simple salts or other additives are added to the gel samples such that the molar ratio of additive to PHPA is about 200,000 to 1 in all cases except ethylene diamine where the ratio is about 100,000. The results are recorded in Table 4 below.

TABLE 4

| Gel Sample Number | Ethylene Diamine | $NaNO_2$ | NaCl | NaI | $Na_2SO_4$ | $NaOOCCH_3$ | KI |
| --- | --- | --- | --- | --- | --- | --- | --- |
| 1 | >10,000 | * | * | * | * | * | * |
| 2 | >10,000 | * | * | * | * | * | * |
| 3 | 77 | * | * | * | * | * | * |
| 4 | 98 | >10,000 | * | >10,000 | >10,000 | >10,000 | >10,000 |
| 5 | 124 | >10,000 | >10,000 | >10,000 | >10,000 | >10,000 | >10,000 |
| 6 | 168 | >10,000 | >10,000 | >10,000 | >10,000 | >10,000 | >10,000 |
| 7 | 217 | >10,000 | >10,000 | >10,000 | >10,000 | >10,000 | >10,000 |
| 8 | 282 | >10,000 | >10,000 | >10,000 | >10,000 | >10,000 | >10,000 |
| 9 | 350 | 9,750 | >10,000 | >10,000 | >10,000 | >10,000 | >10,000 |

TABLE 4-continued

| Gel Sample Number | Ethylene Diamine | NaNO₂ | NaCl | NaI | Na₂SO₄ | NaOOCCH₃ | KI |
|---|---|---|---|---|---|---|---|
| 10 | 376 | 2,180 | 1,570 | >10,000 | 9,000 | 4,150 | >10,000 |

*Gel exhibits severe syneresis.

All samples containing salt additives result in gels with viscosities less sensitive to the gel component concentration. By comparison, the only gel with a non-salt additive, ethylene diamine, did not appear to have diminished sensitivity of viscosity to gel component concentrations.

EXAMPLE 4

Gel samples are prepared corresponding to Table 1, but using Brine A as the aqueous solvent. Brine A has the following salt concentrations:

|  | ppm |
|---|---|
| MgCl₂·6H₂O | 32 |
| CaCl₂ | 44 |
| Na₂SO₄ | 130 |
| NaHCO₃ | 330 |

Gels are formed for three different cases. In the first case, no salt is added to the gel samples. In the second case, 0.008 g NaCl is added per gram of PHPA solution in the sample. In the third case, 0.045 g NaCl is added per gram of PHPA solution in the sample. The added salt concentrations and viscosities of the resultant gel samples are recorded in Table 5 below.

TABLE 5

| | I | II | | III | |
|---|---|---|---|---|---|
| Gel Sample Number | Viscosity (cp) No NaCl Added | Viscosity (cp) With NaCl Added | NaCl Conc (wt %) | Viscosity (cp) With NaCl Added | NaCl Conc (wt %) |
| 1 | * | * | 0.50 | * | 2.8 |
| 2 | * | * | 0.62 | * | 3.5 |
| 3 | * | * | 0.66 | * | 3.7 |
| 4 | * | * | 0.71 | * | 4.0 |
| 5 | * | 3,600 | 0.73 | 983 | 4.1 |
| 6 | * | >10,000 | 0.75 | 3,336 | 4.2 |
| 7 | 60 | 4,166 | 0.75 | >10,000 | 4.2 |
| 8 | 426 | 7,666 | 0.78 | >10,000 | 4.4 |
| 9 | 7,375 | 8,500 | 0.78 | >10,000 | 4.4 |
| 10 | 3,110 | >10,000 | 0.78 | >10,000 | 4.4 |
| 11 | 2,320 | 654 | 0.78 | >10,000 | 4.4 |
| 12 | 1,263 | 283 | 0.80 | >10,000 | 4.5 |
| 13 | 650 | 380 | 0.80 | 2,000 | 4.5 |

*Gel exhibits severe syneresis.

EXAMPLE 5

Gel samples are prepared corresponding to Table 1, but using Brine B as the aqueous solvent. Brine B has the following salt concentrations:

|  | ppm |
|---|---|
| Na₂SO₄ | 3360 |
| NaHCO₃ | 613 |
| K₂SO₄ | 410 |
| MgSO₄ | 693 |
| CaCl₂ | 1270 |

Gels are formed for two different cases. In one case, no salt is added to the gelation solution. In the other case, 2.9 g NaCl is added per gram of PHPA in the sample. The results are shown in Table 6 below.

TABLE 6

| Gel Sample Number | I Viscosity (cp) No NaCl Added | II Viscosity (cp) NaCl Added | NaCl Conc (wt %) |
|---|---|---|---|
| 1 | * | * | 0.62 |
| 2 | * | * | 0.76 |
| 3 | * | * | 0.83 |
| 4 | * | * | 0.88 |
| 5 | * | * | 0.90 |
| 6 | * | >10,000 | 0.93 |
| 7 | * | >10,000 | 0.95 |
| 8 | 3,990 | >10,000 | 0.96 |
| 9 | 3,950 | >10,000 | 0.97 |
| 10 | 25 | >10,000 | 0.97 |
| 11 | 50 | >10,000 | 0.98 |
| 12 | 100 | 6,233 | 0.98 |
| 13 | 120 | 200 | 0.98 |

*Gel exhibits severe syneresis.

The results of Examples 4 and 5 indicate that the viscosity of the gel is rendered less sensitive to gel component concentrations with the addition of a simple salt to the gelation solution, even when the gelation solution is prepared from a brine solvent.

EXAMPLE 6

Gel samples are prepared corresponding to Table 1, but using Brine C as the aqueous solvent. Brine C has the following salt concentrations:

|  | ppm |
|---|---|
| NaHCO₃ | 757 |
| NaCl | 856 |
| CaSO₄ | 1090 |
| MgSO₄ | 386 |
| K₂SO₄ | 116 |

Gels are formed for two cases, Case I without salt addition and Case II with salt addition. In Case II, 2.9 g NaCl is added per gram PHPA in the sample. The added salt concentrations are the same as Table 6.

TABLE 7

| Gel Sample Number | I Viscosity (cp) No NaCl Added | II Viscosity (cp) NaCl Added |
|---|---|---|
| 1 | * | * |
| 2 | * | * |
| 3 | * | * |
| 4 | * | * |
| 5 | * | 7,640 |
| 6 | * | >10,000 |
| 7 | 6,100 | >10,000 |
| 8 | 60 | >10,000 |
| 9 | 120 | >10,000 |
| 10 | 220 | 4,750 |
| 11 | 270 | 223 |
| 12 | 340 | 303 |
| 13 | 307 | 197 |

*Gel exhibits severe syneresis.

Table 7 follows the same trends as Examples 4 and 5.

While the foregoing preferred embodiments of the invention have been described and shown, it is understood that the alternatives and modifications, such as those suggested and others, may be made thereto and follow in the scope of the invention.

I claim:

1. A process for substantially reducing the permeability of at least one relatively high permeability region bounded by a relatively low permeability region in a hydrocarbon bearing formation below an earthen surface penetrated by a well bore in fluid communication with said at least one relatively high permeability region, the process comprising the steps of:
   (a) adding a monovalent salt, which does not substantially crosslink an acrylamide polymer, to an aqueous acrylamide polymer solution in an amount sufficient to render the viscosity of said polymer solution, when crosslinked by a crosslinking system to form a crosslinked gel, less sensitive to the concentrations of said polymer and crosslinking system in said gel;
   (b) sequentially injecting said salt-containing polymer solution and a crosslinking system solution, comprising a compound of a polyvalent metal ion and a reducing compound, into said at least one relatively high permeability region via said well bore;
   (c) mixing said salt-containing polymer solution and crosslinking system solution in situ to form a gelation solution; and
   (d) gelling said gelation solution in said at least one relatively high permeability region by reducing said polyvalent metal ion from a higher valence state to a lower valence state by means of said reducing compound and crosslinking said acrylamide polymer by means of said polyvalent metal ion at said lower valence state in the presence of said monovalent salt to produce said crosslinked gel which substantially reduces the permeability of said at least one relatively high permeability region.

2. The process of claim 1 wherein said acrylamide polymer is a partially hydrolyzed polyacrylamide having about 10 to about 40% of the amide groups hydrolyzed to carboxylate groups.

3. The process of claim 1 wherein said polyvalent metal ion is chromium $6^+$.

4. The process of claim 3 wherein said compound of said polyvalent metal ion is sodium dichromate.

5. The process of claim 4 wherein said reducing compound is sodium bisulfite.

6. The process of claim 1 wherein said monovalent salt comprises a monovalent cation selected from the group consisting of $Na^+$, $K^+$ and $NH_4^+$.

7. The process of claim 6 wherein said monovalent salt is NaCl.

8. The process of claim 1 further comprising sequentially injecting said crosslinking system solution as separate and distinct solutions of said compound of said polyvalent metal ion and said reducing compound.

9. The process of claim 1 wherein said monovalent salt is added to said polymer solution in an amount such that the molar ratio of salt to polymer in said gelation solution is about 100,000 to 1 to about 300,000 to 1.

10. The process of claim 1 wherein said monovalent salt is added to said polymer solution in an amount such that the salt concentration of said gelation solution is about 3,000 to about 30,000 ppm.

11. The process of claim 1 wherein said polymer concentration in said gelation solution is about 1,000 to about 6,000 ppm.

12. The process of claim 1 wherein said compound of said polyvalent metal concentration in said gelation solution is about 200 to about 40,000 ppm.

13. The process of claim 1 wherein said reducing compound concentration in said gelation solution is about 200 to about 40,000 ppm.

14. The process of claim 1 wherein the viscosity of said gel is about 2,000 to about 150,000 cp.

15. A process for substantially reducing the permeability of at least one relatively high permeability region bounded by a relatively low permeability region in a hydrocarbon-bearing formation below an earthen surface penetrated by a well bore in fluid communication with said at least one relatively high permeability region, the process comprising the steps of:
   (a) adding a monovalent salt, which does not substantially crosslink an acrylamide polymer, to a crosslinking system solution, comprising a compound of a polyvalent metal ion and a reducing compound, in an amount sufficient to render the viscosity of an aqueous acrylamide polymer solution, when crosslinked by said crosslinking system solution to form a crosslinked gel, less sensitive to the concentrations of said polymer and crosslinking agent in said gel;
   (b) sequentially injecting said salt-containing crosslinking system solution and said acrylamide polymer solution into said at least one relatively high permeability region via said well bore;
   (c) mixing said salt-containing crosslinking system solution and said acrylamide polymer solution in situ to form a gelation solution; and
   (d) gelling said gelation solution in said at least one relatively high permeability region by reducing said polyvalent metal ion from a higher valence state to a lower valence state by means of said reducing compound and crosslinking said acrylamide polymer by means of said polyvalent metal ion at said lower valence state in the presence of said monovalent salt to produce said crosslinked gel which substantially reduces the permeability of said at least one relatively high permeability region.

16. The process of claim 15 wherein said acrylamide polymer is a partially hydrolyzed polyacrylamide having 10 to about 40% of the amide groups hydrolyzed to carboxylate groups.

17. The process of claim 15 wherein said polyvalent metal ion is chromium $6^+$.

18. The process of claim 17 wherein said compound of said polyvalent metal ion is sodium dichromate.

19. The process of claim 18 wherein said reducing compound is sodium bisulfite.

20. The process of claim 15 wherein said monovalent salt comprises a monovalent cation selected from the group consisting of $Na^+$, $K^+$ and $NH_4^+$.

21. The process of claim 20 wherein said monovalent salt is NaCl.

22. The process of claim 15 further comprising sequentially injecting said crosslinking system solution as separate and distinct solutions of said compound of said polyvalent metal ion and said reducing compound wherein said monovalent salt is added to either or both of said separate and distinct solutions.

23. The process of claim 15 wherein said monovalent salt is added to said polymer solution in an amount such that the molar ratio of salt to polymer in said gelation solution is about 100,000 to 1 to about 300,000 to 1.

24. The process of claim 15 wherein said monovalent salt is added to said polymer solution in an amount such that the salt concentration of said gelation solution is about 3,000 to about 30,000 ppm.

25. The process of claim 15 wherein said polymer concentration in said gelation solution is about 1,000 to about 6,000 ppm.

26. The process of claim 15 wherein said compound of said polyvalent metal concentration in said gelation solution is about 200 to about 40,000 ppm.

27. The process of claim 15 wherein said reducing compound concentration in said gelation solution is about 200 to about 40,000 ppm.

28. The process of claim 15 wherein the viscosity of said gel is about 2,000 to about 150,000 cp.

* * * * *

UNITED STATES PATENT AND TRADEMARK OFFICE
CERTIFICATE OF CORRECTION

PATENT NO. : 4,693,310

DATED : September 15, 1987

INVENTOR(S) : David L. Gibbons

It is certified that error appears in the above-identified patent and that said Letters Patent is hereby corrected as shown below:

Col. 2, line 37: Delete "quantitatively" and insert --qualitatively--.
Col. 2, line 43: Delete "comprises" and insert --comprising--.
Col. 3, line 18: After "insensitive" delete "o" and insert --to--.
Col. 3, line 30: Delete "behaviour" and insert --behavior--.
Col. 4, line 42: Delete "geling" and insert --gelling--.

Signed and Sealed this

Nineteenth Day of January, 1988

Attest:

DONALD J. QUIGG

*Attesting Officer*  *Commissioner of Patents and Trademarks*